United States Patent [19]
Stearns

[11] 3,820,854
[45] June 28, 1974

[54] CONTROL VALVE AND SYSTEM

[75] Inventor: George W. Stearns, St. Louis, Mo.

[73] Assignee: Wagner Electric Corporation, Parsippany, N.J.

[22] Filed: Sept. 26, 1972

[21] Appl. No.: 292,442

Related U.S. Application Data

[62] Division of Ser. No. 137,798, April 27, 1971, Pat. No. 3,746,401.

[52] U.S. Cl. ........................................ 303/9, 303/71
[51] Int. Cl. .............................................. B60t 15/16
[58] Field of Search ..... 303/9, 71, 29, 7, 13, 68–69, 303/82, 85, 37–40, 50; 188/106 P, 170; 137/107, 112–113

[56] References Cited
UNITED STATES PATENTS

| | | | |
|---|---|---|---|
| 3,115,371 | 12/1963 | Valentine | 303/71 |
| 3,285,672 | 11/1966 | Avrea | 303/9 |
| 3,294,455 | 12/1966 | Valentine | 303/9 |
| 3,519,312 | 7/1970 | Cruse | 303/71 |

Primary Examiner—Duane A. Reger
Assistant Examiner—D. C. Butler

[57] ABSTRACT

A brake system for a vehicle having a brake adapted for energization in response to a spring setting pressure released actuator connected therewith is provided with a push-pull type control valve which is selectively operable to control the application and exhaustion of emergency pressure to and from said brake actuator to effect the de-energization and energization of said brake, and said control valve is automatically actuated in response to a predetermined low service pressure subjected thereto to exhaust the emergency pressure from said brake actuator to effect the spring set energization of said brake.

15 Claims, 6 Drawing Figures

CONTROL VALVE AND SYSTEM

This application is a division of co-pending application Ser. No. 137,798 filed Apr. 27, 1971, subsequently issued on July 17, 1973 as U.S. Pat. 3,746,401.

This invention relates generally to brake systems and in particular to those having push-pull type control valves therein for controlling a spring set brake actuator.

BACKGROUND OF THE INVENTION

In the past, tripping or automatically actuated push-pull type control valves have been utilized in fluid pressure systems for controlling the application and exhaustion of emergency fluid pressure to and from a fluid pressure responsive spring set brake actuator to effect the desired de-energization and energization thereof; however, the main undesirable or disadvantageous feature of such past control valves and systems was that said control valve sensed or was automatically responsive to the same emergency fluid pressure which it delivered to the system.

SUMMARY OF THE INVENTION

The principle object of the present invention is to respectively provide a brake system and a control valve therefore which overcomes the aforementioned undesirable and disadvantageous feature of such past brake systems and control valves, and this, as well as other objects and advantageous features of the present invention, will become apparent hereinafter.

Briefly, the invention includes a brake system having a brake adapted for spring set energization by a spring setting pressure released actuator in response to emergency pressure applied thereto less than a predetermined value, and means automatically actuated in response to service pressure subjected thereto less than a predetermined value for venting the emergency pressure applied to said actuator including other means for overriding the automatic actuation of said first named means. The invention also comprises a control valve having application means automatically actuated in response to a predetermined minimum value of control fluid pressure acting thereon to isolate the fluid pressure applied through said control valve from that supplied thereto and vent the applied fluid pressure to the atmosphere, and said application means including means selectively operable to override the automatic actuation of said application means.

DESCRIPTION OF THE DRAWINGS

In the drawings which illustrate embodiments of the invention and wherein like numerals refer to like parts wherever they occur.

Figure 1:
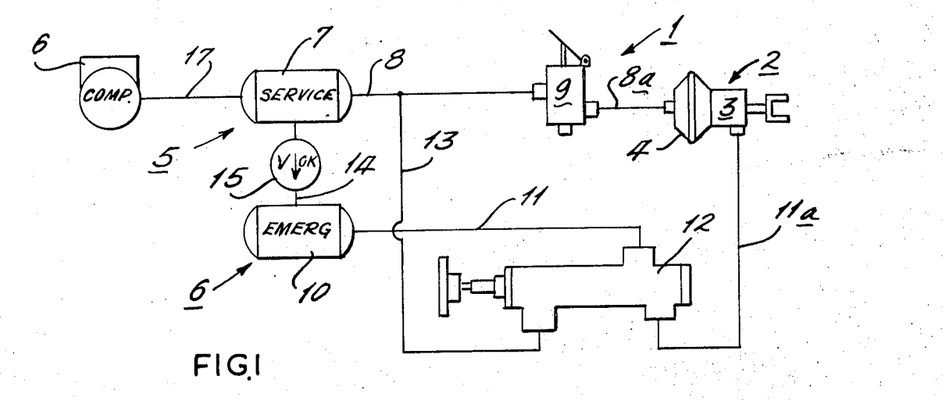
FIG. 1 is a schematic view of a fluid pressure system embodied in the present invention.

Referring now to the drawings in detail and in particular to FIG. 1, a dual fluid pressure or brake system 1 is shown for use on a vehicle having at least one spring setting pressure released brake cylinder or actuator 2 of a type well known in the art and including an emergency or spring set portion 3 and a service or fluid pressure responsive or motor portion 4 for energizing a vehicle brake (not shown). The system 1 is provided with service and emergency branches, indicated generally at 5, 6, and said service branch includes a service reservoir 7 connected with the fluid pressure responsive motor 4 of the brake actuator 2 by conduits 8, 8a, having the inlet and outlet sides of an operator actuated foot application valve 9 of a type well known in the art serially interposed therebetween. The emergency branch 6 includes an emergency reservoir 10 which is connected to the spring set portion 3 of the brake actuator 2 by conduits 11, 11a having the inlet and outlet ports of a push-pull type control valve 12 serially interposed therebetween, and a control conduit 13 has one end connected to the control port of said push-pull control valve while the other end thereof is connected to the conduit 8 between the service reservoir 7 and application valve 9. To complete the description of the system 1, another conduit 14 having an uni-directional or one-way check valve 15 interposed therein is connected between the service and emergency reservoirs 7, 10, and fluid pressure generating means, such as compressor 16, is connected to said service reservoir by a conduit 17.

Figure 2:
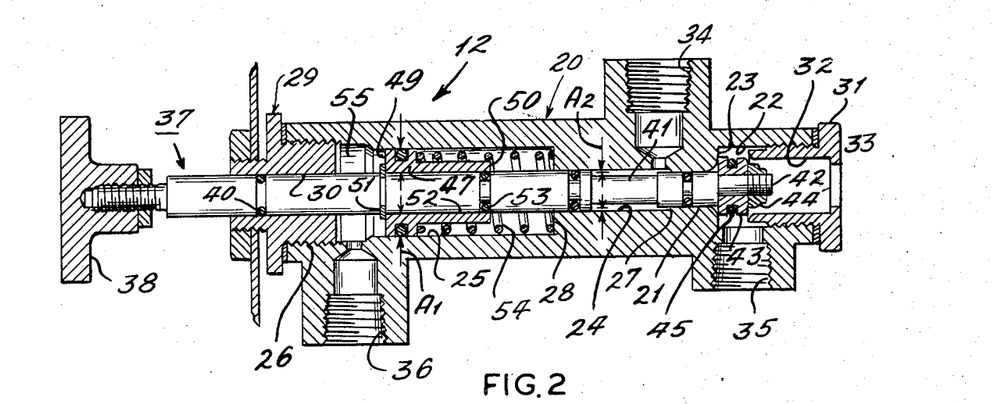
FIG. 2 is a sectional view illustrating the control valve of FIG. 1, also embodied in the present invention, in its automatically actuated or "out" position in cross-section.

Referring now to FIG. 2, the control valve 12 is provided with a housing 20 having a bore 21 defining a valve set therein. A counterbore 22 is also provided in the housing 20 coaxial with the bore 21 and defining therewith an annular shoulder or abutment 23 on said housing, and opposed stepped counterbores 24, 25, 26 are also provided in said housing coaxially aligned with said bore, said bore and counterbore 21, 24 and said counterbores 24, 25 having shoulders or abutments 27, 28 respectively defined therebetween on said housing. A closure member or end plug 29 having axial bore 30 therethrough is threadedly received in the leftward end of the counterbore 26, and another closure member or end plug 31 having a bore 32 defining a valve seat therein and exhaust port 33 connected with said bore is threadedly received in the rightward end of the counterbore 22. Inlet and outlet ports or supplied and applied fluid pressure ports 34, 35 which are interposed in the conduit 11, as previously mentioned, are provided in the housing 20 intersecting with the counterbores 24, 22 adjacent to the shoulders 23, 27, respectively, and a control port 36 which receives the conduit 13, as previously mentioned, is also provided in said housing intersecting with the counterbore 26.

A selectively operable or application member, such as the push-pull rod indicated generally at 37, is provided with an exteriorally extending, operator applied force receiving portion, such as the knob 38, and said rod is slidably received in the housing and clusre member bores 24, 30 carrying peripheral seals 39, 40 in sealing engagement therewith, respectively. The push rod 37 is provided with an integral reduced extension 41 which extends through the housing bore and counterbores 21, 22, 24 having a reduced free end portion 42 thereon in the closure member bore 32. A piston 43 is retained on the extension free end 42 against displacement by suitable means, such as the nut 44, and said piston is normally displaced from sliding engagement with the closure member bore 32 toward abutment with the housing shoulder 23. A seal or valve member 45 is peripherally carried on the piston 43 for sealing engagement with the closure member bore or valve seat 32 between the outlet and exhaust ports 35, 33, and another seal or valve member 46 is peripherally carried on the rod extension 41 normally being sealably engaged with the housing bore or valve seat 21 to interrupt pressure fluid communication between the inlet and outlet ports 34, 35.

An automatic actuating or resiliently urged member, such as the control piston 47, is slidably received in the housing counterbore 25 carrying a peripheral seal 48 in sealing engagement therewith, and opposed ends or abutment surfaces 49, 50 are provided on said piston for abutting engagement with a snap ring or driven shoulder or abutment 51 provided on the push rod 37 and the housing shoulder 28, respectively. An axial bore 52 is provided in the piston 48 intersecting with the opposed ends 49, 50 thereof and in which the rod 37 is slidably received, and another seal 53 is peripherally carried on said rod in sealing engagement with the piston bore 52. A spring 54 is precompressed between the housing shoulder 28 and the piston 47 urging the piston end 49 into driving engagement with the rod abutment 51 to normally urge the rod 37 toward its "out" position, as shown and described in FIG. 2.

An expansible control chamber 55 is defined in the housing counterbores 25, 26 between the closure member 29 and piston 47 in open pressure fluid communication with the control port 36, and an annular effective area $A_1$ is defined on said piston in said control chamber by the sealing engagement of the seals 48, 53 with the housing counterbore 25 and the piston bore 52, respectively. When the rod 37 is in its "out" position, as shown in FIG. 2, an annular effective area $A_2$ defined between the sealing engagements of the seals 39, 46 with the housing counterbore and bore 24, 21, respectively, is provided on the rod 37 and subjected to the fluid pressure at the inlet port 34 to establish a holding force Fo acting to maintain said rod in its "out" position. To complete the description of the control valve 12, when the rod 37 is in its "in" position as shown in FIG. 3 and discussed hereinafter, another annular effective area $A_3$, opposed to area $A_2$ and defined by the sealing engagement of the seals 39, 45 with the housing counterbore 24 and the closure member bore 32, is provided on said rod and subjected to the fluid pressure at the outlet port 35 to establish another holding force Fi acting to maintain said rod in its "in" position.

OPERATION

With the component parts of the control valve 12 in their "out" positions as shown in FIG. 2 and described hereinbefore, fluid pressure generated by the compressor 16 flows through the conduit 17 into the service reservoir 7 and therefrom through the conduit 14 and check valve 15 into the emergency reservoir 10. The fluid pressure also flows from the service reservoir 7 through the conduits 8, 13 to the control port 36 of the control valve 12 and therefrom into the control chamber 55 acting on the area $A_1$ of the control piston 47.

Figure 3:
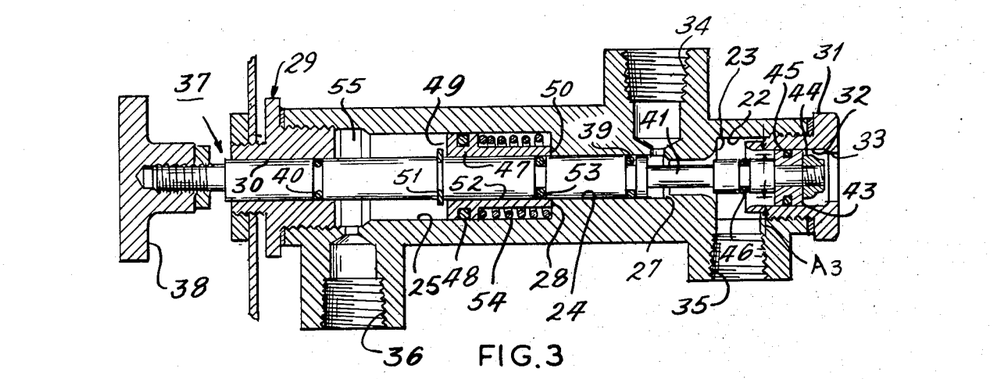
FIG. 3 is a sectional view illustrating the control valve of FIG. 2 in its "in" position in cross-section.

When the force Fs of the service fluid pressure in excess of a predetermined value acting on the area $A_1$ overcomes the opposing compressive force Fc of the spring 54, the control piston 47 is moved rightwardly against said spring toward an inoperative position disengaging the piston end 49 from the rod abutment 51 and engaging the piston end 50 with the housing shoulder 28, as shown in FIG. 3.

In order to de-actuate the spring set portion 3 of the brake actuator 2 and de-energize the brake (not shown), the operator applies a manual force on the exterior end or knob 38 of the control valve push rod 37 overcoming the holding force Fo to move said rod rightwardly toward its "in" position, as shown in FIG. 3. Movement of the rod 37 toward its "in" position initially engages the valve member 45 with the valve seat 32 interrupting pressure fluid communication between the outlet and exhaust ports 35, 33 and thereafter disengages the valve member 46 from its valve seat 21 to establish pressure fluid communication between the inlet and outlet ports 34, 35. Of course, with the rod 37 in its "in" position, the rod abutment 51 is repositioned adjacent to the control piston 47 in its inoperative position, and the holding force Fi replaces the holding force Fo which is eliminated. With the inlet and outlet ports 34, 35 in open pressure fluid communication, emergency fluid pressure which is supplied from the conduit 11 to said inlet port flows therefrom through the housing bore and counterbore 21, 22 to establish an applied or emergency fluid pressure at the outlet port 35 which flows therefrom through the conduit 11a to the spring set portion 3 of the brake actuator 2 to effect the de-actuation thereof and the de-energization of the brake. When the rod 37 is in its "in" position, the operator applied force is removed therefrom wherein the established holding force Fi will maintain said rod in the "in" position, and the service force Fs acting on the control piston 47 will, of course, continue to contain the compressive force Fs of the spring 54.

In the event of failure of the service fluid pressure due to compressor malfunction, slow leaks, a ruptured conduit or the like in the service branch 5 of the system 1 wherein the service fluid pressure is eliminated or reduced to a value less than the predetermined value, the service force Fs is, of course, eliminated or correspondingly reduced in value, and the force Fc of the spring 54 is effective to automatically and concertedly drive the control piston 47 and rod 37 leftwardly through the driving connection of the piston end 49 with the rod abutment 51 from the "in" position to the "out" position of said rod. In this manner, the control valve 12 is automatically actuated wherein the valve member 46 is moved leftwardly with the rod 37 to re-engage the valve seat 21 and again isolate the supplied fluid pressure at the inlet port 34 from the applied fluid pressure at the outlet port 35, and the valve member 45 is thereafter disengaged from its valve seat 32 to re-establish pressure fluid communication between the outlet and exhaust ports 35, 33 to exhaust the emergency fluid pressure applied to the spring set portion 3 of the brake actuator 2 through the conduit 11a, said outlet port, the closure member bore 32 and said exhaust port to the atmosphere. When the applied emergency fluid pressure is so reduced, the spring set portion 3 of the actuator 2 is actuated to effect an emergency or spring setting energization of the brake under the aforementioned emergency conditions, i.e., the lose or predetermined reduction of the service fluid pressure.

Of course, if desired, the operator can override the automatic actuation of the control valve 12 by the control piston 47 upon the loss of the service fluid pressure. The override is accomplished by re-applying and maintaining a manual force on the exterior end 38 of the rod 37 to manually move said ord to its "in" position, as previously described, against the compressive force Fc of the spring 54 acting on said rod through the driving connection of the engagement of the end 49 of the control piston 47 with the rod abutment 51. It is, of course, desirable to override the automatic function of the control valve 12 in order to temporarily de-actuate the spring set portion 3 of the actuator 2 and de-energize the brake to permit the movement of the vehicle to a safe or off-the-road position until the service branch 5 can be repaired and the system 1 is once again operable. When the vehicle has been moved to the desired safe location for the repair of the system 1, the manually applied force is removed from the rod 37 wherein the compressive force Fc of the spring 54 is again operable to concertedly drive the piston 52 and said rod to the "out" position thereof which again interrupts pressure fluid communication between the inlet and outlet ports 34, 35 and re-establishes venting communication between the outlet and exhaust ports 35, 33 to again actuate the spring set portion 4 of the brake actuator 2 and energize the brake, as described hereinbefore.

Figure 4:
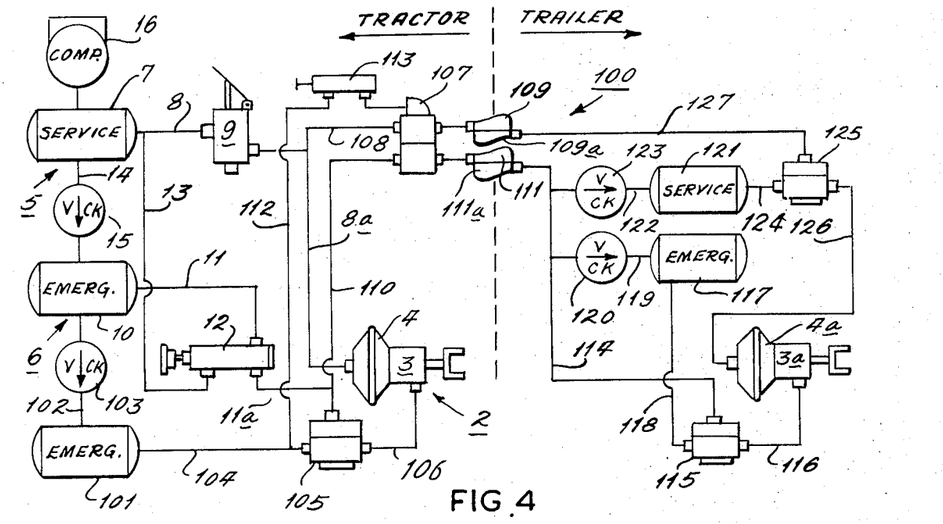
FIG. 4 is a schematic view illustrating another fluid pressure system also embodied in the present invention.

Referring now to FIG. 4, another fluid pressure system 100 is shown for use in the tractor-trailer vehicle combination having substantially the same component parts and functioning in substantially the same manner as the previously described system 1 with the following exceptions.

In the system 100, a completely protected or auxilliary emergency reservoir 101 is connected with the emergency reservoir 10 by a conduit 102 having a uni-directional flow or check valve 103 interposed therein, and another conduit 104 is connected between said auxilliary emergency reservoir 101 and the inlet side of a ratio-relay 105 of a type well known in the art such as shown in the R. C. Wright, Jr., U.S. Pat. No. 2,858,840 issued Nov. 4, 1958, for instance. The outlet or delivery side of the relay valve 105 is connected by a conduit 106 with the spring set portion 3 of the brake actuator 2, and the conduit 11a is connected between the outlet port 35 of the control valve 12 and the control side of said relay valve. Of course, the ratio-relay valve 105 is operable in response to fluid pressure from the auxiliary emergency reservoir 101 through the conduit 104, the inlet and delivery sides of said ratio-relay valve and the conduit 106 to de-actuate the spring set portion 3 of the brake actuator 2, and it should be noted that the emergency fluid pressure applied to said actuator is in a predetermined ratio, e.g., a 3:1 ratio, with the signal or control fluid pressure applied to said ratio-relay valve by said control valve.

A tractor-protector valve 107 of a type well known in the art such as that shown in the Cyril B. Fites U.S. Pat. No. 2,859,763 issued Nov. 11, 1958, is also provided in the system 100 between the tractor and trailer portions thereof. The service portion of the tractor-protector valve 107 is interposed in a conduit 108 connected between the conduit 8a and a tractor service gladhand 109 which is coupled with a trailer service gladhand 109a, and the emergency portion of said tractor-protector valve is interposed in a conduit 110 connected between the conduit 11a and a tractor emergency gladhand 111 which is coupled with a trailer emergency gladhand 111a. A control conduit 112 is connected between the conduit 104 and the control portion of the tractor-protector valve 107, and a push-pull valve 113 of the "on-off" type well known in the art is interposed in the conduit 112, said push-pull valve being movable between its "on" position providing open pressure fluid communication through the conduit 112 to the control portion of the tractor-protector valve 107 and its "off" position interrupting said pressure fluid communication and connecting the control portion of said tractor-protector valve to the atmosphere.

The trailer portion of the brake system 100 includes a conduit 114 connected between the trailer emergency gladhand 111a and the control side of another ratio-relay valve 115 of the same type as the ratio-relay valve 105 previously discussed herein, and the outlet side of said ratio-relay valve 115 is connected by a conduit 116 with the spring set portion 3a of a trailer brake actuator 2a of the same type as the brake actuator 2 previously discussed herein. The inlet side of the ratio-relay valve 115 is connected with a trailer emergency reservoir 117 by a conduit 118, and another conduit 119 having a uni-directional or check valve 120 interposed therein is connected between said trailer emergency reservoir and the conduit 114.

A trailer service reservoir 121 is also connected with the conduit 114 by a conduit 122 having a protection valve 123 of a type well known in the art interposed therein, said protection valve being a type of check valve which is being loaded to permit fluid pressure flow therethrough in excess of a predetermined value, e.g., 30 p.s.i., through the conduit 122 to said trailer service reservoir. Another conduit 124 is connected between the trailer service reservoir 121 and the inlet side of a relay valve 125 of a type well known to the art, and the outlet side of said relay valve is connected with the service or fluid pressure responsive portion 4a of the brake actuator 2a by a conduit 126. To complete the description of the system 100, another service conduit 127 is interposed between the trailer service gladhand 109a and the control side or portion of the relay valve 125.

In the operation of the system 100 with the control valve 12 actuated to its "in" position, fluid pressure flows from the emergency reservoir 10 through conduits 11, 11a and said control valve to charge the control portion of the ratio-relay valve 105 which is actuated or driven thereby to a wide open position effecting open or dumping pressure fluid communication or flow from the auxiliary emergency reservoir 101 through the conduits 104, 106 and said ratio-relay valve to the spring set portion 3 of the tractor brake actuator 2. In this manner, the fluid pressure so applied to the actuator spring set portion 3 effects the de-actuation thereof which results in the deenergization of the tractor brakes, and it is, of course, apparent that the auxiliary emergency reservoir 101 will be charged through the conduit 102 and its protective check valve 103 with fluid pressure from the emergency reservoir 10.

With the push-pull valve 113 in its "charging or on" position, pressure fluid also flows from the auxiliary emergency reservoir 101 through the conduits 104, 112 and said push-pull valve to the control side of the tractor protector valve 107 which serves to "cock" or maintain the service and emergency portions of said tractor protector valve open to provide pressure fluid flow from the conduit 11a through the conduit 110, the emergency portion of said tractor protector valve, the tractor and trailer emergency gladhands 111, 111a and the conduit 114 to the control portion or side of the ratio-relay valve 115 to effect actuation thereof. Of course, fluid pressure also flows from the conduit 114 through conduits 119, 122 and the check and protector valves 120, 123 therein to charge the trailer emergency and service reservoirs 117, 121, respectively. The actuation of the ratio-relay valve 115 in response to the fluid pressure applied to the control side thereof drives said ratio-relay valve to a wide open position effecting open or dumping pressure fluid communication between the inlet and outlet sides thereof to effect an unmetered application of fluid pressure from the trailer emergency reservoir 117 through the conduit 118 and said ratio-relay valve to the trailer brake actuator 2a in order to de-actuate the spring set portion 3a thereof and de-energize the trailer brakes (not shown).

With the tractor and trailer brake actuator spring set portions 3, 3a so de-actuated, the operator can now move the vehicle and effect service braking application to decelerate or stop the vehicle. For instance, an operator applied force on the foot valve 9, meters fluid pressure from the tractor service reservoir 7 through conduits 8, 8a and said foot valve to the fluid pressure responsive motor 4 of the tractor actuator 2 to effect service energization of the tractor brake associated therewith, and at the same time the metered service fluid pressure also flows through the conduit 108, the service portion of the tractor protector valve 107, the tractor and trailer service gladhands 109, 109a and the conduit 127 to the control side or portion of the relay valve 125 to effect metering actuation thereof. The relay valve 125 is responsive to the fluid pressure metered to the control portion thereof to effect metered pressure fluid flow from the trailer service reservoir 121 through the conduits 124, 126 and said relay valve to the trailer brake actuator 2a in order to actuate the fluid pressure responsive motor 4a thereof and effect service energization of the trailer brakes (not shown).

In the event of a fluid pressure failure in the service branch 5 due to a compressor malfunction, slow leaks, or a ruptured conduit or the like, wherein the service fluid pressure is reduced to the aforementioned predetermined value or eliminated, the control valve 12 functions automatically, as previously described hereinbefore, to isolate the conduit 11 and emergency reservoir 10 and vent the conduit 11a and the control portion of the ratio-relay valve 105 to the atmosphere. The ratio-relay valve 105 is de-actuated in response to the venting of the control portion thereof to isolate the conduit 104 and auxiliary emergency reservoir 101 and vent the conduit 106 and the spring set portion 3 of the tractor actuator 2 to the atmosphere thereby actuating said spring set portion and effecting spring setting energization of the tractor brakes. At the same time, the control portion of the ratio-relay valve 115 is also exhausted to atmosphere through the conduit 114, the emergency gladhands 111, 111a, conduit 110 and the emergency portion of the tractor protector valve 107, the conduit 11a, and the automatically actuated control valve 12. The ratio-relay valve 115 is de-actuated in response to the venting of the control portion thereof to isolate the conduit 118 and the trailer emergency reservoir 117 and vent the conduit 116 and the spring set portion 3a of the trailer brake actuator 2a to the atmosphere thereby actuating said spring set portion and effecting a spring setting energization of the trailer brakes substantially simultaneously with the spring setting energization of the tractor brakes.

The overriding actuation of the control valve 12 by the operator, as previously described hereinbefore, reapplies the fluid pressure remaining in the emergency reservoir 10 therefrom to the control portions of the ratiorelay valves 105, 115, respectively, in the same manner as previously described; however, it should be noted that the protection valve 123 will open at its predetermined pressure, e.g., 30 p.s.i. to thereby limit the magnitude of the fluid pressure applied to the override application of the control valve 12 during the emergency conditions of an inoperative service branch 5. Nevertheless, since the ratio-relay valves 105, 115 are of the ratio or multiplying types, they are responsive to the relatively low override fluid pressures applied to their control portions to meter an intensified or greater ratioed fluid pressure from the completely protected tractor and trailer emergency reservoirs 101, 117 to the tractor and trailer brake actuators 2, 2a to de-actuate the spring set portions 3, 3a thereof and effect an override de-energization of the tractor and trailer brakes in order to effect temporary movement of the vehicle to a safe or off-the-road position until the service branch 5 can be repaired to once again preserve the integrity of the system 100.

Figure 5:
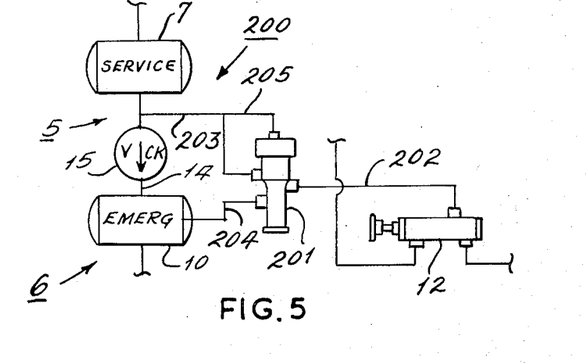
FIG. 5 is a partial schematic view of an alternative fluid pressure system also embodied in he present invention.

Referring now to FIG. 5, an alternative fluid pressure system 200 is partially shown for use in the tractor-trailer vehicle combination having substantially the same component parts and functioning in substantially the same manner as the previously described system 100 with the following exceptions.

In the system 200, a biased two-way check valve or fluid pressure switching valve 201 is connected between the service and emergency reservoirs 7, 10 and the control valve 12. The outlet port of the switching valve 201 is connected with the service port 34 of the control valve 12 by a conduit 202, and the inlet ports of said switching valve are connected with the service and emergency reservoirs 7, 10 by conduits 203, 204, respectively. To complete the description of the system 200, another conduit 205 is connected between the conduit 203 and the control port of the switching valve 201; however, it should be noted that the other components (not shown) of the system 200 are comparable to those of the system 100, but are omitted for the sake of expediency.

Figure 6:
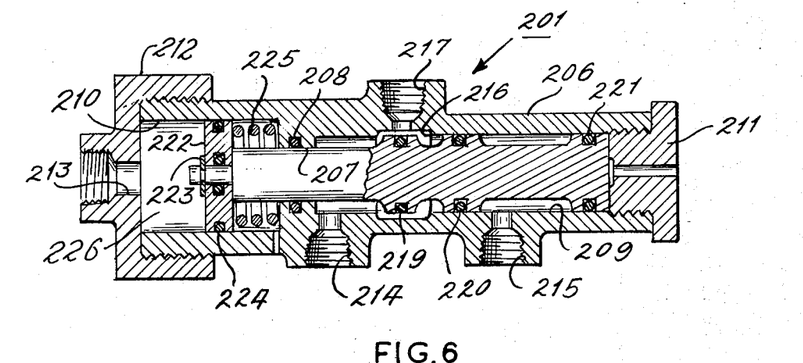
FIG. 6 is a sectional view illustrating the switching valve of FIG. 5 embodied in the present invention in cross-section.

The switching valve 201, FIG. 6, is provided with a housing 206 having a bore 207 carrying a seal 208 therein, and said bore is interposed between opposed counterbores 209, 210. The counterbores 209, 210 are closed by closure members 211, 212 which are threadedly connected with the housing 206, and a control port 213 which receives the conduit 205, as previously mentioned, is provided in the closure member 212 in pressure fluid communication with the counterbore 210. Spaced inlet ports 214, 215 which receive the service and emergency conduits 203, 204, as previously mentioned, are provided in the housing 206 intersecting with the counterbore 209, respectively, and said counterbore is undercut at 216 between said inlet ports, said undercut being connected with an outlet port 217 which receives the conduit 202, as previously mentioned.

A switch or valve control member 218 is slidably received in the bore and counterbore 208, 209 and extends coaxially into the counterbore 210, and peripheral seals 219, 220, 221 are carried in said valve control member. The seal 221 is sealably engaged with the counterbore 209 between the inlet port 215 and the closure member 21, and the portions of the counterbore 209 adjacent to the undercut 216 therein define valve seats for the seals or valve members 219, 220, respectively. A piston 222 is connected with the leftward end of the valve control member 218 by suitable means, such as the snap ring 223, and said piston carries a peripheral seal 224 in sealing engagement with the counterbore 210. A spring 225 is biased between one side of the piston 222 and the housing 206 in the counterbore 210, and an expansible control chamber 226 is defined in said counterbore between said piston and the closure member 212 in open pressure fluid communication with the control port 213.

With the component parts of the switch valve 201 positioned as shown in FIG. 6 and as described hereinabove, the service fluid pressure from the service reservoir flows through the conduits 203, 205 and the control port 213 of said switching valve into the control chamber 226 acting on the effective area of the piston 222 to urge said piston rightwardly against the compressive force of the spring 225 and engage the valve control member 218 with the closure member 211. In this "cocked" position, the valve 220 is engaged with its cooperating valve seat to interrupt pressure fluid communication between the inlet and outlet ports 215, 217, and the valve 219 is displaced from its cooperating valve seat to effect pressure fluid flow from the service reservoir 7 through the conduit 203, the inlet port 214, counterbore 209, undercut 216 and outlet port 217 of the switch valve 201 and therefrom through the conduit 202 to the inlet port 34 of the control valve 12.

In the event of the loss of the service fluid pressure in an emergency condition, as previously mentioned, the compressive force of the spring 225 drives the piston 222 leftwardly into engagement with the closure member 212, and the valve control member 218 is concertedly movable with said piston to engage the valve 219 with its cooperating valve seat interrupting pressure fluid communication between the inlet and outlet ports 214, 217 and disengages the valve 220 from its cooperating valve seat to establish pressure fluid communication between the inlet and outlet ports 215, 217. In this manner, the switching valve 201 is actuated to establish pressure fluid flow from the emergency reservoir 10 through the conduit 204, the inlet port 215, counterbore 209, undercut 216 and outlet port 217 of said switching valve and therefrom through the conduit 202 to the inlet port 34 of the control valve 12.

From the foregoing, it is now apparent that novel fluid pressure systems 1, 100, 200 and control valves 12, 201 therefor meeting the objects and advantages set out hereinbefore, as well as others, are provided and that changes as to the precise configurations set forth in the disclosure by way of illustration may be made by those skilled in the art without departing from the spirit of the invention.

The embodiments of the invention in which an exclusive property or privilege is claimed are defined as follows:

1. A fluid pressure system comprising a brake, a brake actuator responsive to fluid pressure applied thereto less than a predetermined value for energizing said brake, control means including selectively operable means movable between positions for respectively applying fluid pressure in excess of the predetermined value of said actuator and venting the applied fluid pressure therefrom to the atmosphere, other means automatically operable in response to another fluid pressure less than another predetermined value for moving said selectively operable means to its venting position, opposed abutment means on said selectively operable means and said other means defining a driving engagement therebetween, and said other means being concertedly movable with said selectively operable means in response to an operator applied force thereon from its venting position to its applying position when the other fluid pressure acting on said other means is less than the other predetermined value.

2. A fluid pressure system according to claim 1, wherein said other means includes resiliently urged means, said resiliently urged means being movable in response to its own force to drive said selectively operable means toward its venting position when the other fluid pressure acting on said resiliently urged means is less than the other predetermined value.

3. A fluid pressure system according to claim 2, comprising an effective area on said resiliently urged means subjected to the other fluid pressure, said resiliently urged means being movable against its own force toward an inoperative position in said control means in response to the other fluid pressure in excess of the other predetermined value acting on said area, and said resiliently urged means being movable in response to its own force toward an operative position in said control means to urge said selectively operable means therewith toward its venting position when the other fluid pressure acting on said area is less than the other predetermined value.

4. A fluid pressure system according to claim 3, comprising an abutment in said control means for engagement with said resiliently urged means and defining the inoperative position thereof.

5. A fluid pressure system according to claim 3, wherein said abutment means are drivingly engaged to drive said selectively operable means to its venting position upon the movement of said resiliently urged means to its operative position and to drive said resiliently urged means against its own force toward its inoperative position in response to movement of said selectively operable means in response to an operator applied force thereon from its venting position toward its applying position when the other fluid pressure acting on said area is less than the other predetermined value, and one of said abutment means being disengaged from the other thereof upon the movement of said resiliently urged means to its inoperative position in response to the other fluid pressure in excess of the other predetermined value acting on said area and relative to said selectively operable means in its venting position.

6. A fluid pressure system according to claim 5, wherein said resiliently urged means includes piston means movable in said control means, said area and one of said abutment means being on said piston means, spring means engaged with said piston means and urging said one abutment means toward engagement with the other of said abutment means, said piston means being movable against said spring means toward its inoperative position in response to the other fluid pressure in excess of the other predetermined value acting on said area and relative to said selectively operable means in its venting position, and said piston means being movable toward its operative position in response to the force of said spring means to effect the driving engagement of said one abutment means with the other of said abutment means on said selectively operable means in its applying position and the concerted driving of said selectively operable means to its venting position when the other fluid pressure acting on said area is less than the predetermined value.

7. A fluid pressure system according to claim 6, comprising opposed end portions on said piston means, one of said opposed end portions including said one abutment means and said area, a bore in said piston means between said opposed end portions, and selectively operable means being slidably received in said bore, an abutment on said control means for engagement with the other of said opposed end portions and defining the inoperative position of said piston mens, and said one opposed end portion defining an expansible chamber in said control means subjected to the other fluid pressure.

8. A fluid pressure comprising a brake, a brake actuator responsive to fluid pressure applied thereto less than a predetermined value for energizing said brake, control means including selectively operable means movable between positions for respectively applying fluid pressure in excess of the predetermined value to said actuator and venting the applied fluid pressure therefrom to the atmosphere, other means automatically operable in response to another fluid pressure less than another predetermined value for moving said selectively operable means to its venting position, a pair of sources for the first named and other fluid pressures, check valve means protecting one of said sources from the other thereof, said control means being connected with said sources, said selectively operable means in its applying position normally applying the first named fluid pressure in excess of the first named predetermined value from said one source to said brake actuator and said other means being subjected to the other fluid pressure at said other source.

9. A fluid pressure system according to claim 8, comprising a fluid pressure responsive motor for energizing said brake, and application means for selectively applying the other fluid pressure from said other source to said motor to effect selective energization of said brake.

10. A fluid pressure system according to claim 9, comprising a third fluid pressure source, second check valve means for protecting said third source from said one source, and relay valve means responsive to the first named fluid pressure applied thereto from said control means to apply fluid pressure from said third source in excess of the first named predetermined value to said brake actuator when said selectively operable means is in its applying position, said relay valve means also being operable to isolate said third source and brake actuator and vent the fluid pressure applied to said brake actuator to atmosphere to effect the energization of said brake upon the movement of said selectively operable means to its venting position.

11. A fluid pressure system according to claim 10, comprising a fourth fluid pressure source connected with said control means for receiving fluid pressure from said one source when said selectively operable means is in its applying position, third check valve means protecting said fourth source from said control means, another brake, a second brake actuator responsive to fluid pressure applied thereto less than the first named predetermined value for energizing said other brake, and second relay valve means responsive to the first named fluid pressure applied thereto from said control means to apply fluid pressure from said fourth source in excess of the first named predetermined value to said second brake actuator when said selectively operable means is in its applying position, and said second relay valve means also being operable to isolate said fourth source and second brake actuator and vent the fluid pressure applied to said second brake actuator to the atmosphere upon the movement of said selectively operable means to its venting position.

12. A fluid pressure system according to claim 11, comprising a second fluid pressure responsive motor for selectively energizing said other brake, a fifth fluid pressure source connected with said control means for receiving fluid pressure from said one source when said selectively operable means is in its applying position, protecting valve means permitting pressure fluid flow from said control means to said fifth source only at a magnitude in excess of a third predetermined value, and third relay valve means responsive to the other fluid pressure applied by said application means to said first named motor for metering fluid pressure from said fifth source to said second motor to effect the selective energization of said other brake.

13. A fluid pressure system according to claim 12, wherein the fluid pressure applied by said first and second relay valve means from said third and fifth sources to said first named and other brake actuators are predeterminately greater than that applied to said first and second relay valve means from said one source upon the movement of said selectively operable means from its venting position to its applying position when the other fluid pressure is less than the other predetermined value, and the magnitude of the fluid pressure applied to said first and second relay valve means upon the movement of said selectively operable means from its venting to its applying position being limited to a value not in excess of the third predetermined value by said protecting valve means in the event of the failure of said fifth source.

14. A fluid pressure system comprising a brake, a brake actuator responsive to fluid pressure applied thereto less than a predetermined value for energizing said brake, a pair of fluid pressure sources, a pair of control means, one of said control means being connected with said sources including means movable in response to fluid pressure subjected thereto from one of said sources in excess of and less than a predetermined value for supplying fluid pressure from one of said one sources and the other of said sources to the other of said control means, and said other control means including selectively operable means movable between positions for effecting the application of the supplied fluid pressure to said brake actuator and venting the applied fluid pressure therefrom, and other means automatically responsive to fluid pressure subjected thereto from said one source less than another predetermined value for moving said selectively operable means to its venting position.

15. A fluid pressure system comprising a brake, a brake actuator responsive to fluid pressure applied thereto less than a predetermined value for energizing said brake, a fluid pressure source, relay valve means controlling pressure fluid communication between said source and actuator, a pair of fluid pressure sources, control means including selectively operable means for respectively applying fluid pressure to said relay valve means and venting the applied fluid pressure therefrom, and other means responsive to fluid pressure at one of said source pairs less than another predetermined value for moving said selectively operable means to its venting position, said relay valve means being responsive to fluid pressure applied thereto to establish pressure fluid communication between said first named source and said actuator and also being responsive to vent said actuator and effect the energization of said brake upon the movement of said selectively operable means to its venting position, and other control means including means responsive to the fluid pressure at said one of said source pairs for communicating said selectively operable means with one of said one and other source pairs.

* * * * *

UNITED STATES PATENT OFFICE
CERTIFICATE OF CORRECTION

Patent No. 3,820,854          Dated June 28, 1974

Inventor(s) George W. Stearns

It is certified that error appears in the above-identified patent and that said Letters Patent are hereby corrected as shown below:

Column 1, line 66, "he" should read -- the --. Column 2, line 35, "set" should read -- seat --; line 62, "clusre" should read -- closure --. Column 5, line 1, "lose" should read -- loss --. Column 6, line 35, "being" should read -- spring --. Column 8, line 13, "ratiorelay" should read -- ratio-relay --; line 17, "to" should read -- by --. Column 11, line 21, "and" should read -- said --; line 25, "mens" should read -- means --.

Signed and sealed this 12th day of November 1974.

(SEAL)
Attest:

McCOY M. GIBSON JR.              C. MARSHALL DANN
Attesting Officer                 Commissioner of Patents